(12) United States Patent
Umezurike (10) Patent No.: US 10,911,217 B1
(45) Date of Patent: Feb. 2, 2021

(54) ENDPOINT-TO-ENDPOINT CRYPTOGRAPHIC SYSTEM FOR MOBILE AND IOT DEVICES

(71) Applicant: Josiah Johnson Umezurike, Columbia, SC (US)

(72) Inventor: Josiah Johnson Umezurike, Columbia, SC (US)

( * ) Notice: Subject to any disclaimer, the term of this patent is extended or adjusted under 35 U.S.C. 154(b) by 279 days.

(21) Appl. No.: 15/875,378

(22) Filed: Jan. 19, 2018

Related U.S. Application Data (60) Provisional application No. 62/448,560, filed on Jan. 20, 2017.

(51) Int. Cl.
| | |
|---|---|
| *H04L 9/00* | (2006.01) |
| *H04L 9/06* | (2006.01) |
| *H04L 9/08* | (2006.01) |
| *H04W 12/04* | (2009.01) |
| *H04L 9/32* | (2006.01) |
| *G06F 40/10* | (2020.01) |

(52) U.S. Cl.
CPC .......... *H04L 9/0618* (2013.01); *H04L 9/0863* (2013.01); *H04L 9/3231* (2013.01); *H04W 12/04* (2013.01); *G06F 40/10* (2020.01)

(58) Field of Classification Search
CPC .............................. H04L 9/0618; H04L 9/0863
USPC ......................................................... 380/28
See application file for complete search history.

(56) References Cited

U.S. PATENT DOCUMENTS

| | | | |
|---|---|---|---|
| 7,995,748 B2 * | 8/2011 | Thaker | G09C 1/00 380/28 |
| 8,335,966 B1 | 12/2012 | Lary et al. | |
| 8,379,848 B2 | 2/2013 | Muise et al. | |
| 2007/0016804 A1 * | 1/2007 | Kemshall | G06F 21/34 713/193 |
| 2008/0279367 A1 | 11/2008 | Thaker et al. | |
| 2010/0189316 A1 * | 7/2010 | Walch | G06K 9/0008 382/125 |
| 2015/0229613 A1 * | 8/2015 | Baum | G06F 16/00 713/171 |

\* cited by examiner

*Primary Examiner* — Morshed Mehedi
*Assistant Examiner* — Michael D Anderson
(74) *Attorney, Agent, or Firm* — Kinney & Lange, P.A.

(57) ABSTRACT

Encryption of communications includes receiving plain text from a computing device and encrypting the plain text with knight's tour encryption. The knight's tour encryption includes generating a knight's tour table based upon a starting position, generating a cipher template by mapping Unicode characters of a standard state table to the knight's tour table, and mapping the plain text to indices of a first cipher template. The knight's tour encryption further includes generating a silent password, mapping the silent password to indices of a second cipher template, and adding the password indices of the first cipher template to the silent password indices of the second cipher template resulting in cipher indices. The knight's tour encryption further includes mapping the cipher indices to the first cipher template, and generating a cipher text string from the Unicode characters associated with the cipher indices mapped to the first cipher template.

24 Claims, 12 Drawing Sheets

KNIGHT'S TOUR TABLE 20

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 16 | 83 | 36 | 39 | 6 | 75 | 80 | 41 | 8 | 53 | 64 | 43 | 10 | 49 | 56 | 45 | 12 |
| 15 | 38 | 5 | 84 | 81 | 40 | 7 | 74 | 87 | 42 | 9 | 54 | 63 | 44 | 11 | 48 | 57 |
| 14 | 35 | 82 | 37 | 76 | 93 | 86 | 79 | 52 | 73 | 110 | 65 | 50 | 55 | 62 | 13 | 46 |
| 13 | 4 | 117 | 94 | 85 | 90 | 77 | 92 | 109 | 88 | 51 | 72 | 111 | 66 | 47 | 58 | 61 |
| 12 | 95 | 34 | 3 | 120 | 115 | 108 | 89 | 78 | 129 | 112 | 209 | 70 | 169 | 60 | 67 | 14 |
| 11 | 118 | 121 | 116 | 107 | 2 | 91 | 130 | 113 | 210 | 71 | 170 | 203 | 208 | 69 | 168 | 59 |
| 10 | 33 | 96 | 119 | 126 | 131 | 114 | 1 | 128 | 171 | 232 | 211 | 254 | 167 | 204 | 15 | 68 |
| 9 | 122 | 125 | 132 | 181 | 106 | 127 | 172 | 231 | 0 | 253 | 202 | 207 | 212 | 255 | 166 | 205 |
| 8 | 97 | 32 | 123 | 136 | 173 | 198 | 183 | 200 | 233 | 230 | 241 | 252 | 249 | 206 | 213 | 16 |
| 7 | 124 | 133 | 180 | 105 | 182 | 137 | 234 | 197 | 242 | 201 | 250 | 229 | 240 | 215 | 248 | 165 |
| 6 | 31 | 98 | 135 | 174 | 193 | 178 | 199 | 184 | 235 | 238 | 243 | 246 | 251 | 228 | 17 | 214 |
| 5 | 134 | 175 | 104 | 179 | 138 | 185 | 192 | 237 | 196 | 245 | 222 | 239 | 216 | 247 | 164 | 227 |
| 4 | 99 | 30 | 139 | 186 | 177 | 194 | 145 | 220 | 191 | 236 | 159 | 244 | 223 | 226 | 157 | 18 |
| 3 | 140 | 27 | 176 | 103 | 144 | 187 | 190 | 195 | 148 | 221 | 224 | 217 | 158 | 161 | 154 | 163 |
| 2 | 29 | 100 | 25 | 142 | 189 | 102 | 23 | 146 | 219 | 150 | 21 | 160 | 225 | 152 | 19 | 156 |
| 1 | 141 | 28 | 101 | 24 | 143 | 188 | 149 | 22 | 147 | 218 | 151 | 20 | 155 | 162 | 153 | |

ENDPOINT-TO-ENDPOINT CRYPTOGRAPHIC SYSTEM FOR MOBILE AND IOT DEVICES

CROSS-REFERENCE TO RELATED APPLICATION(S)

This application claims the benefit of U.S. Provisional Application No. 62/448,560 filed Jan. 20, 2017 for "ENDPOINT-TO-ENDPOINT CRYPTOGRAPHIC SYSTEM FOR MOBILE AND IOT DEVICES" by Josiah Johnson Umezurike, which is hereby incorporated by reference in its entirety.

BACKGROUND

The present day cryptosystem is threatened due to ever increasing processor speed. Additional computing power is provided by cloud services. The threat is compounded by numerous attack vectors made available by the Internet of Things (IoT) ecosystem. The processing power of quantum computing will further increase the threat to our present day cryptosystem. Today our system for data security hinges around:
 1. Using of password of at least 8 characters with one Capital letter, number and special character.
 2. Using password hashing to match the actual passwords.
 3. Using certificate authority (CA) to show non-repudiation of messages.
 4. Using key management services (KMS) to keep record of keys used in encryption. Since this process could be expensive for most they end up using static keys mostly saved in the hard disks.
 5. Using initialization vectors to complete the blocks of messages needed for encryption. This adds to the size of the entire message.
 6. Using Delfie Hellman' elliptical curve for the key and password: Advanced Encryption Standard (AES) algorithm is used as a part of hybrid cryptosystem to send the actual message. The pass word will be needed to decrypt the message.

All of these present data security methods are becoming increasingly vulnerable to attacks as the available processing power increases. This will pose a security challenge with the Internet of Things continues to grow, providing more devices to that are susceptible to attack.

SUMMARY

In one example, a system for verifying devices and encrypting communication includes a computing device configured to receive plain text, and one or more processors configured to encrypt the plain text with knight's tour encryption. The one or more processors are configured to encrypt the plain text with knight's tour encryption by being configured to generate a knight's tour table based upon a starting position, generate a cipher template by mapping Unicode characters of a standard state table to the knight's tour table, and map the plain text to indices of a first cipher template. The one or more processors are further configured to encrypt the plain text with knight's tour encryption by being configured to generate a silent password, map the silent password to indices of a second cipher template, and add the password indices of the first cipher template to the silent password indices of the second cipher template resulting in cipher indices. The one or more processors are further configured to encrypt the plain text with knight's tour encryption by being configured to map the cipher indices to the first cipher template, and generate a cipher text string from the Unicode characters associated with the cipher indices mapped to the first cipher template.

In another example, a method for verifying devices and encrypting communication includes receiving plain text from a computing device, and encrypting the plain text using one or more processors with knight's tour encryption in response to receiving the plain text. The knight's tour encryption includes generating a knight's tour table based upon a starting position, generating a cipher template by mapping Unicode characters of a standard state table to the knight's tour table, and mapping the plain text to indices of a first cipher template. The knight's tour encryption further includes generating a silent password, mapping the silent password to indices of a second cipher template, and adding the password indices of the first cipher template to the silent password indices of the second cipher template resulting in cipher indices. The knight's tour encryption further includes mapping the cipher indices to the first cipher template, and generating a cipher text string from the Unicode characters associated with the cipher indices mapped to the first cipher template.

DETAILED DESCRIPTION

Apparatus, systems, and associated methods relate to endpoint-to-endpoint cryptographic systems using knight's tour solutions for cyber security. In some applications, such as IoT devices, endpoint-to-endpoint cryptography using knight's tour solutions is used to secure devices, user profiles, user information, etc. Using the apparatus, systems, and associated methods herein, allows for a cryptographic systems and methods which can remain secure even as processing power continues to increase.

Figure 1:
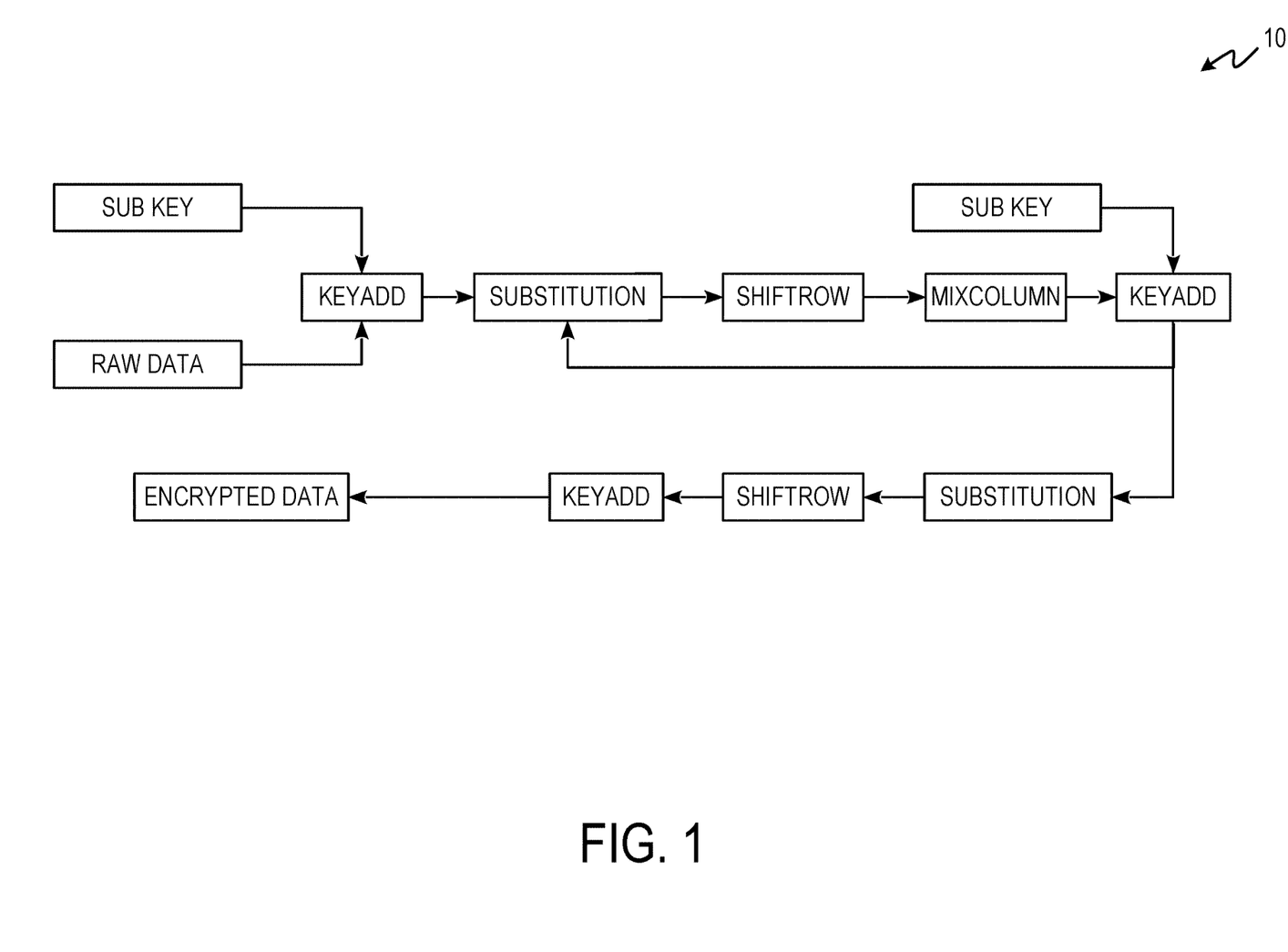
FIG. 1 is a process flow diagram of an AES encryption scheme.

FIG. 1 is a process flow diagram of AES encryption scheme 10. FIG. 1 shows the National Institute of Standards and Technology (NIST) approved encryption system for data encryption. AES includes shifting of rows and the mixing of columns. In contrast, the endpoint-to-endpoint cryptography systems and methods discussed herein include new features to fit the emerging IoT's stored and transient data. The inverse matrix which had become the core of the AES scheme for years is not used. Keys and pass words (hashed in the database of priori art) are not stored anywhere ever.

Figure 2A:
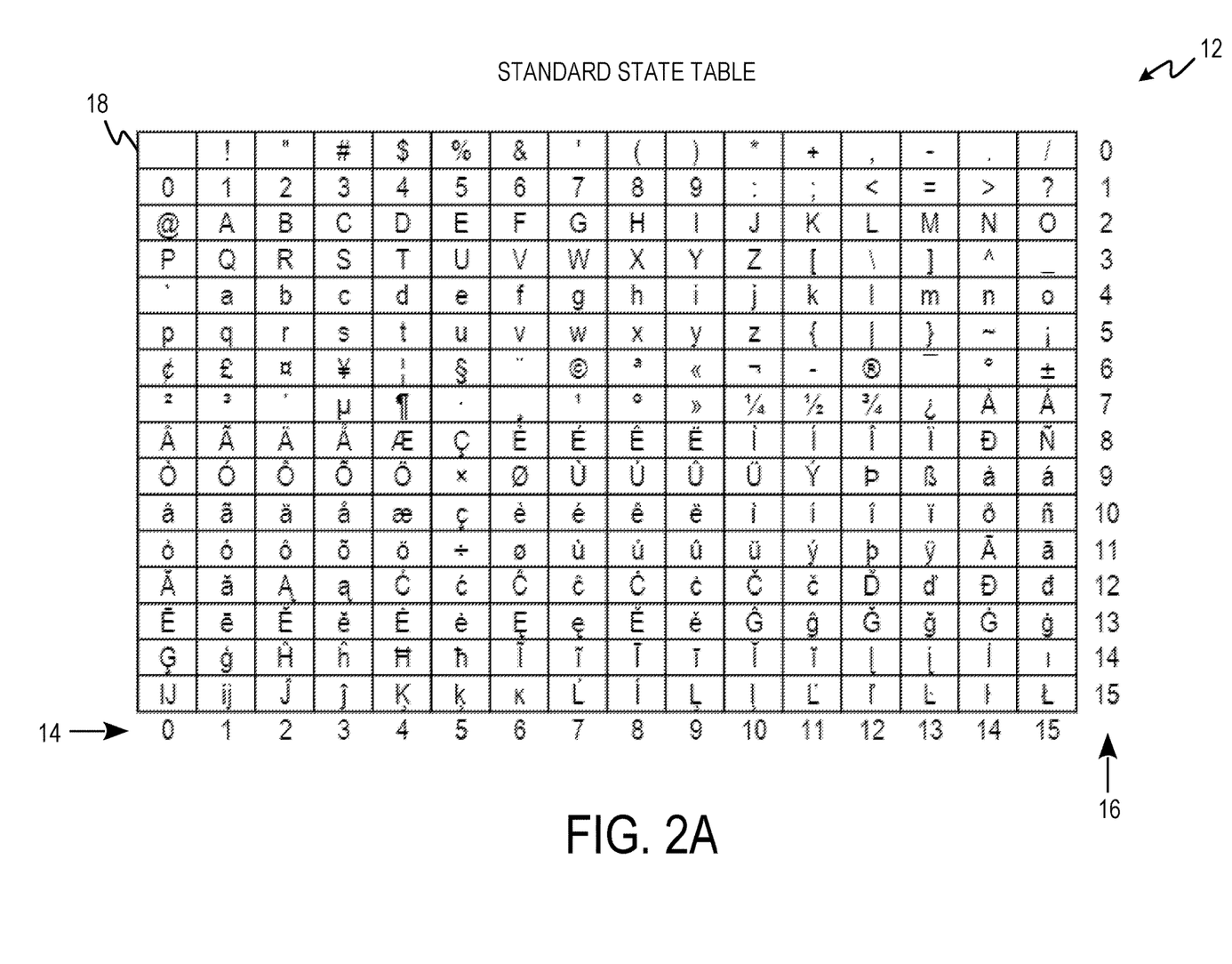
FIG. 2A-2C depict knight's tour encryption/decryption components.
Figure 2B:
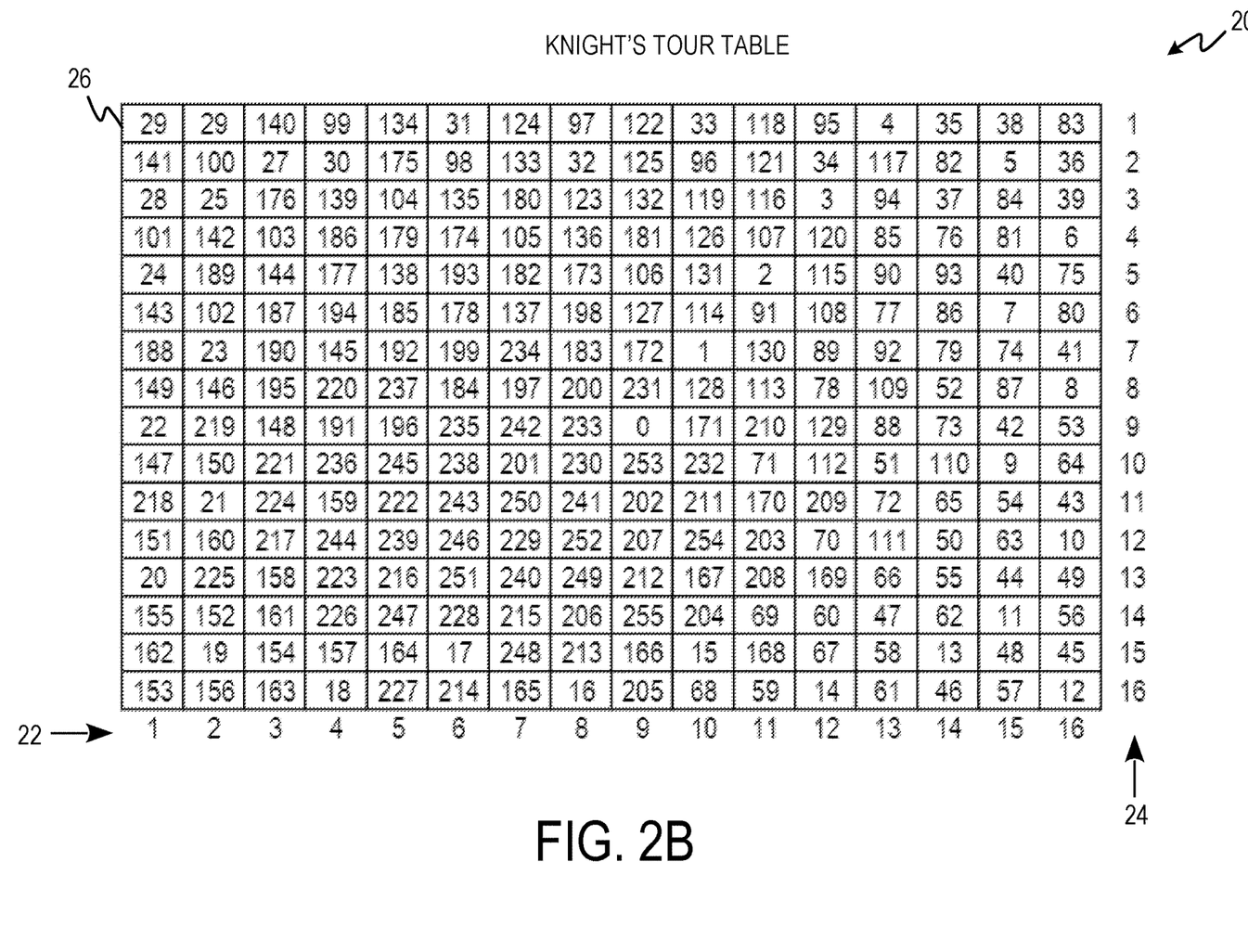
Figure 2C:
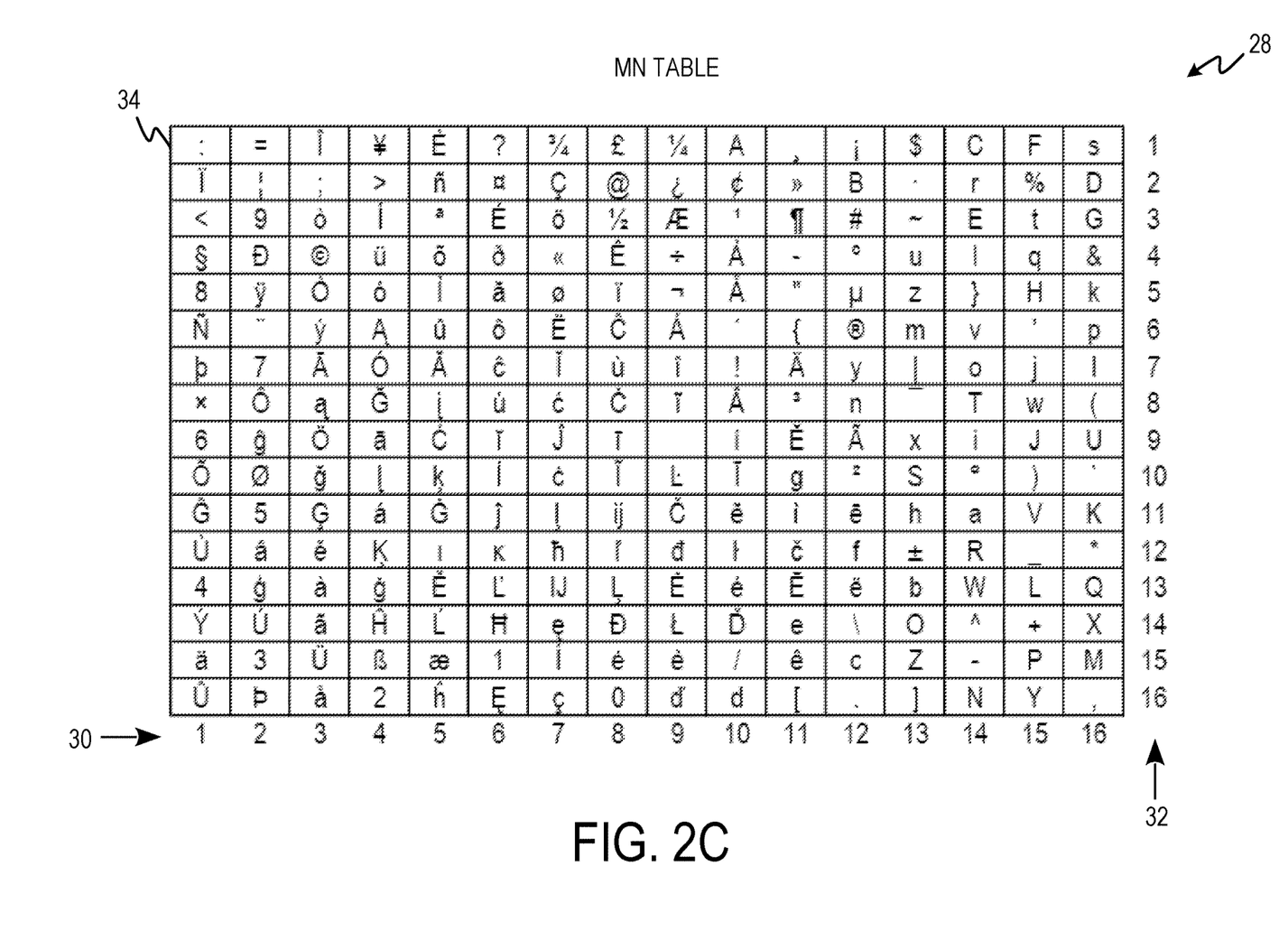

FIG. 2A-2C depict knight's tour encryption/decryption components. FIG. 2A depicts standard state table (ST) 12 including column numbers 14, row numbers 16, and matrix 18.

Standard state table 12 is composed of 16 by 16 matrix 18 which contains Unicode characters. The Unicode characters are indexed from 0-255 for a total of 256 characters. Element 0 is located at column 0, row 0. As columns are traversed the element number increases by one and as rows are traversed the element number increases by 16. This results in element 16 being located at column 0, row 1; and element 255 being located at column 15, row 15. Matrix 18 as shown includes Basic Latin (127), Latin 1 supplement (96), Latin Supplement (A-C) (33) based on Unicode ISO/IEC (International Organization for Standardization [ISO], International Electrotechnical Commission [IEC])10646. The sequence of characters of matrix 18 can be represented mathematically as:

$$ST=(st_0, st_1, st_2, st_3 \ldots st_{n-3}, st_{n-2}, st_{n-1}, st_{255})$$ (Equation 1)

A reverse ST (SL-ST) can be generated such that the characters appear in a matrix in the reverse order of matrix 18. Reverse ST can be represented mathematically as:

$$SL\text{-}ST=(st_{255}, st_{n-1}, st_{n-2}, st_{n-3} \ldots st_3, st_2, st_1, st_0)$$ (Equation 2)

FIG. 2B depicts knight's tour table (KT) 20 including column numbers 22, row numbers 24, and matrix 26.

Knight's tour table 20 is composed of 16 by 16 matrix 26 which contains numerals 0-255. Knight's tour table 20 is generated by choosing a starting position and attaching numbers to the vertices of the movement performed during a knight's tour, where a knight of a chess game performs a legal knight move (two squares sideways and one square up or down or vice-versa). Any starting position in matrix 26 is capable of yielding sub-sequence of non-ordered numerals (0-255) with $256^{256}$ arrangements. In this example, the starting position is column 9, row 9, or index 136. This is indicated with the numeral 0. Numeral 1 is placed a legal knight's move away at column 10, row 7. Numerals are placed a legal knight's move away from the preceding numeral until all numerals are placed and matrix 26 is filled. The numbers can be represented mathematically as:

$$KT_n=(kt_0, kt_1, kt_2, kt_3 \ldots kt_{n-3}, kt_{n-2}, kt_{n-1}, kt_{255})$$ (Equation 3)

A reverse KT (SL-KT) can be generated such that the characters appear in a matrix in the reverse order of matrix KT. Reverse KT can be represented mathematically as:

$$SL\text{-}KT_n=(kt_{255}, kt_{n-1}, kt_{n-2}, st_{n-3} \ldots kt_3, kt_2, kt_1, kt_0)$$ (Equation 4)

Knight's tour tables, such as knight's tour table 20, are generated in software using computer hardware including one or more processors. A starting position is given and numeral 0 is placed at the starting position 0. Numeral 1 is placed a valid knight's move away from the starting position which is the resulting position of move 1. Numeral 2 is placed a valid knight's move away from numeral 2 which the resulting position of move 2, and so on until a knight's tour is completed. There are multiple valid knight's moves at each given position. The actual knight's move used at each position is chosen randomly. Each randomly chosen move can be chosen using a random number generator.

FIG. 2C depicts cipher template ($M_n$) 28 including column numbers 30, row numbers 32, and matrix 34.

Cipher template 28 is composed of 16 by 16 matrix 34 which contains Unicode characters. The Unicode characters of matrix 34 are the same Unicode characters of standard state table 12 mapped to knight's tour table 20. The space Unicode character is placed at index 0 or row 1, column 1 of standard state table 12. The space Unicode character of cipher template 28 is mapped to the starting position of knight's tour table 20 row 9, column 9 or position zero. The '!' Unicode character is placed at index 1 or row 1, column 2 of standard state table 12. The '!' Unicode character of cipher template 28 is mapped to the move 1 position of knight's tour table 20 row 7, column 10. Each Unicode character is mapped from its index in standard state table 12 to its corresponding move position of knight's tour table 20 until matrix 34 is filled and contains ever Unicode character used in standard state table 20. Cipher template 28 can be reversed in the same manner as standard state table 12 and knight's tour table 20 to produce a reverse cipher template (SL-$M_n$). SL-$M_1$ can be achieved in two ways. The first is to map Reverse ST to $KT_1$ to get SL-$M_1$. The second is to map ST to $KT_1$ and reverse $M_1$ produced to get SL-$M_1$.

Figure 3:
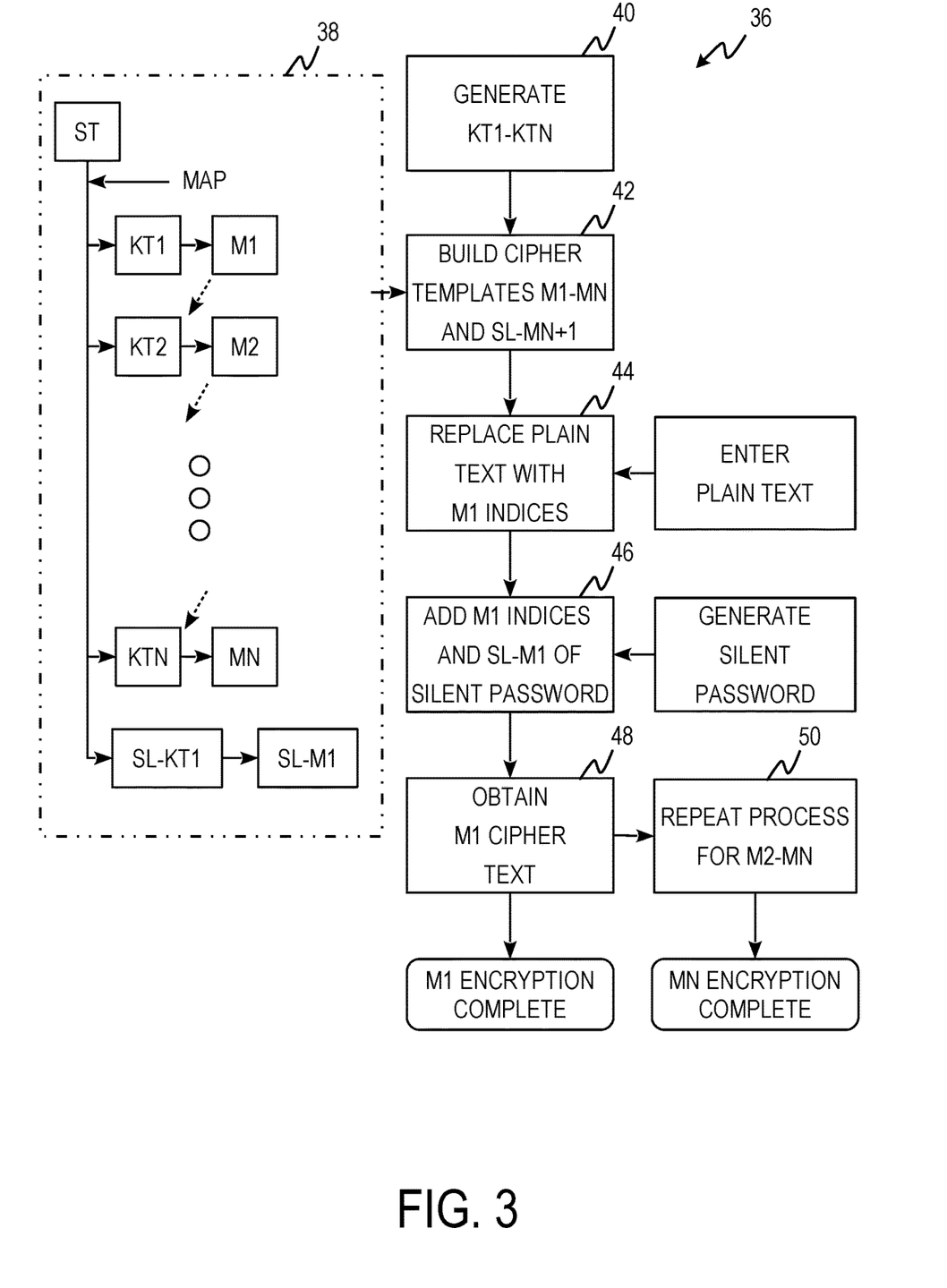
FIG. 3 is a process flow diagram of encryption/decryption process 12 using a knight's tour solution.

FIG. 3 is a process flow diagram of encryption/decryption process 36 including cipher template creation chart 38 and steps 40, 42, 44, 46, 48, and 50.

Cipher template creation chart 38 is a block diagram showing the generation of $M_1$-$M_n$ and SL-$M_1$. $M_1$ is generated by mapping ST to a first knight's tour table ($KT_1$). $M_2$ is generated by mapping ST to a second knight's tour table ($KT_2$). This continues until $M_n$ is generated by mapping ST to an nth knight's tour table ($KT_n$). Knight's tour tables are generated from random starting positions. For example, to generate $M_1$-$M_5$, 5 starting positions are randomly generated from 0 to 255 resulting in 2, 5, 10, 53, and 189. $KT_1$ would have a starting position of 2, $KT_2$ would have a starting position of 5, $KT_3$ would have a starting position of 10, $KT_4$ would have a starting position of 53, and $KT_5$ would have a starting position of 189. SL-$KT_1$ is the reverse of $KT_2$. ST is mapped to SL-$KT_1$ producing SL-$M_1$. SL-$M_1$ is used for implementing silent pass words. Silent passwords are used to encrypt plain text messages as will be shown in the steps of encryption/decryption process 36.

At step 40, $KT_1$-$KT_n$ are generated. N random starting positions are generated, one random number for each KT, from which n KTs are generated. At step 42, $M_1$-$M_n$ are generated. The Unicode characters of ST are mapped to $KT_1$-$KT_n$ to generate $M_1$-$M_n$ respectively. At step 44, plain text is entered and replaced by $M_1$ indices. At step 46, the $M_1$ indices of the plain text are added to the SL-$M_1$ indices of a silent password using modular arithmetic to obtain cipher text. The silent password is a randomly generated string the same length as the plain text. The silent password is randomly generated from the Unicode characters used in ST. Using modular arithmetic if the sum of original message and the silent password is greater than the scope (which in this case is 256) then subtract 256 from the numbers representing the new values. At step, 48 the cipher text is obtained by mapping the resulting indices back to the Unicode characters of $M_1$ and $M_1$ level encryption is complete. At step 50, steps 44, 46, and 48 are repeated for $M_2$-$M_n$ substituting the cipher text of the previous encryption level for the plain text. The $M_1$ cipher text is used in place of plain text in $M_2$, the $M_2$ cipher text is used in place of the plain text for $M_3$, and so on. When $M_n$ cipher text is obtained encryption is finished.

$M_1$ encryption using plaintext h-e-l-l-i is shown in a step by step example below:

Step 40

$KT_1$ is generated, such that $KT_1$ is identical to knight's tour table 20 of FIG. 2B.

Step 42

$M_1$ is generated from $KT_1$. $M_1$ is identical to cipher template 28 because $KT_1$ is identical to knight's tour table 20 from which cipher template 28 was derived.

Step 44

Plain text h-e-l-l-i is entered and mapped to $M_1$ indices.

| Plain Text | h | e | l | l | i |
|---|---|---|---|---|---|
| Corresponding $M_1$ Indices | 172 | 218 | 61 | 61 | 141 |

Step 46

Silent password is randomly generated, mapped to SL-$M_1$, and added to the plain text $M_1$ indices using modular arithmetic.

| | | | | | |
|---|---|---|---|---|---|
| Generated Silent Password | o | d | 0 | Q | W |
| Corresponding SL-$M_1$ Indices | 146 | 6 | 8 | 48 | 50 |
| Plain Text + Silent Password | 318 | 224 | 69 | 109 | 191 |
| (Modular Arithmetic) | −256 | | | | |
| Resulting $M_1$ Indices | 62 | 224 | 69 | 109 | 191 |

Step 48

Cipher text is obtained by mapping the resulting $M_1$ indices of step 46 to $M_1$ Unicode characters.

| $M_1$ Cipher Text | q | ä | ă | ‘ | * |
|---|---|---|---|---|---|

$M_2$ encryption could be applied by generating a $KT_2$ and a corresponding $M_2$, using the $M_1$ cipher text in place of the plain text, and using the same silent password. Once encryption is complete the message can be sent. The message will be cipher text+silent password+knight's tour starting positions+SL-$M_1$ starting position. For the example M1 encryption the message would be:

q ä*od0QW L (space character between W and L)

To decrypt the cipher text the $KT_1$ and $M_1$ tables would be generated from the starting positions given in the message. The cipher text and silent password would be used with the generated tables to decrypt the message. The $M_1$ example above would be decrypted in the following manner:

| $M_1$ Cipher Text | q | ä | ă | ‘ | * |
|---|---|---|---|---|---|
| Corresponding $M_1$ Indices | 62 | 226 | 69 | 109 | 191 |
| Silent Password | o | d | 0 | Q | W |
| Corresponding SL-$M_1$ Indices | 146 | 6 | 8 | 48 | 50 |
| Cipher Text − Silent Password | −84 | 218 | 61 | 61 | 141 |
| Modula Arithmetic | 256 | | | | |
| (add 256 to negative results) | | | | | |
| Resulting ST Indices | 172 | 218 | 61 | 61 | 141 |
| Plain Text | h | e | l | l | i |

In some examples, 5 passes of knight's tour encryption are used to encrypt plain text. $M_1$-$M_2$ encryption is used in these examples. In these examples 5 starting positions ($P_{KT}$) for knight's tour tables ($KT_1$-$KT_5$) are randomly generated. The standard state table is mapped to each of the knight's tour tables to generate cipher templates ($M_1$-$M_5$). Modular addition of the plain text with the silent password results in Cipher Text (CT). Each encryption pass uses the same silent password. A table showing an abbreviated 5 pass knight's tour encryption of a user password is shown below:

Password+Silent Password=$CT_1$ ⇨ $M_1$ Encrypt=[$CT_1$] [$P_{SPKT}$][$P_{KT1}$]

$CT_1$+Silent Password=$CT_2$ ⇨ $M_2$ Encrypt=[$CT_2$][$P_{SPKT}$] [$P_{KT2}$]

$CT_2$+Silent Password=$CT_3$ ⇨ $M_3$ Encrypt=[$CT_3$] [$P_{SPKT}$] [$P_{KT3}$]

$CT_3$+Silent Password=$CT_4$ ⇨ $M_4$ Encrypt=[$CT_4$] [$P_{SPKT}$] [$P_{KT4}$]

$CT_4$+Silent Password=$CT_5$ ⇨ $M_5$ Encrypt=[$CT_5$][$P_{SPKT}$] [$P_{KT5}$]

Figure 4:
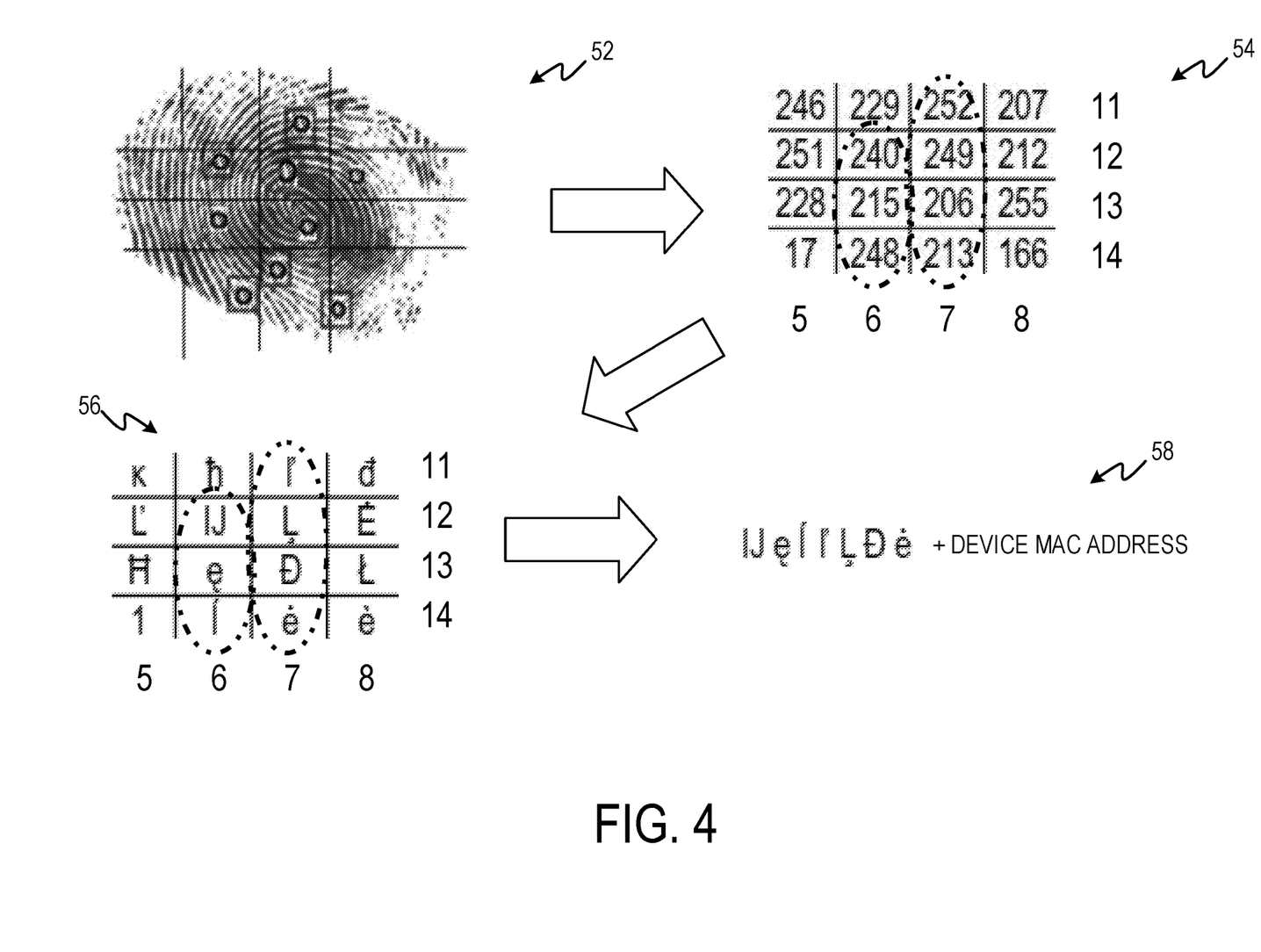
FIG. 4 is an electronic finger print ridge identifier string derivation using knight's tour encryption/decryption.

FIG. 4 is an electronic finger print ridge identifier string derivation including thumb print overlay 52, $KT_1$ overlay 54, $M_1$ overlay 56, and string 58. Thumb print overlay 52 is a thumb print captured by an electronic finger print ridge detection system overlaid with a grid. $KT_1$ overlay 54 is a mapping of thumb print overlay 52 to a portion of $KT_1$. Elements of $KT_1$ that correspond to dominant ridges of the captured thumb print are circled. $M_1$ overlay 56 is a mapping of the thumbprint to $M_1$ where corresponding elements to $KT_1$ are circled. String 58 is derived from the circled portions of $M_1$ overlay 56. FIG. 4 is one example of mapping a thumb print to a cipher template to obtain an encrypted key using a fingerprint.

Figure 5:
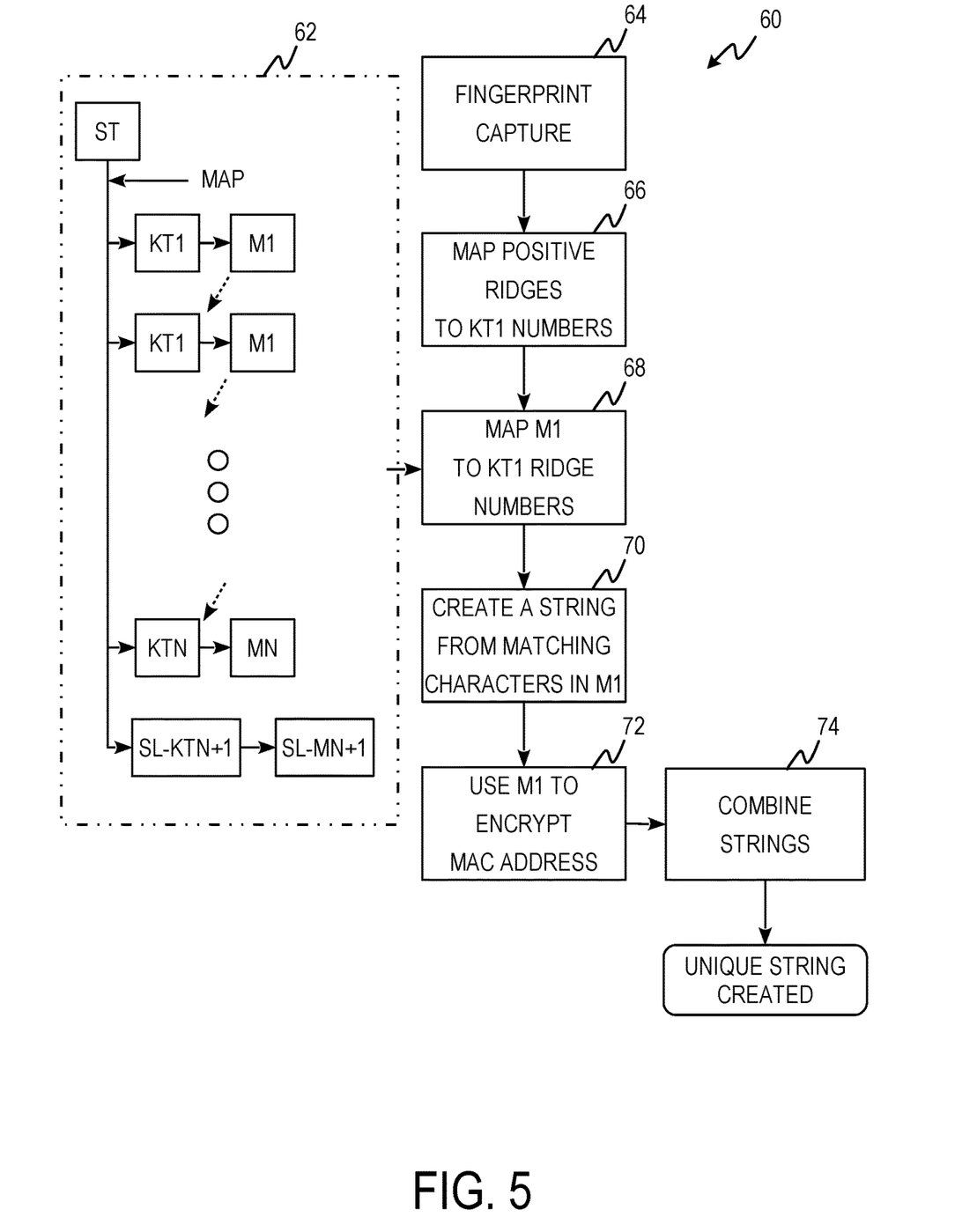
FIG. 5 is an electronic finger print ridge identifier string process flow using knight's tour encryption/decryption.

FIG. 5 is electronic finger print ridge identifier (eFRI) string process flow 60 including cipher template creation chart 62 and steps 64, 66, 68, 70, 72, and 74.

Cipher template creation chart 62 is a block diagram showing the generation of $M_1$-$M_n$ and SL-$M_1$. $M_1$ is generated by mapping ST to a first knight's tour table ($KT_1$). $M_2$ is generated by mapping ST to a second knight's tour table ($KT_2$). This continues until $M_n$ is generated by mapping ST to an nth knight's tour table ($KT_n$). Knight's tour tables are generated from random starting positions. For example, to generate $M_1$-$M_5$, 5 starting positions are randomly generated from 0 to 255 resulting in 2, 5, 10, 53, and 189. $KT_1$ would have a starting position of 2, $KT_2$ would have a starting position of 5, $KT_3$ would have a starting position of 10, $KT_4$ would have a starting position of 53, and $KT_5$ would have a starting position of 189. SL-$KT_1$ is the reverse of $KT_2$. ST is mapped to SL-$KT_1$ producing SL-$M_1$. SL-$M_1$ is used for implementing silent pass words. Silent passwords are used to encrypt plain text messages as will be shown in the steps of electronic finger print ridge identifier string process flow 60.

At step 64, a digital image of a user's finger print is captured. The user's fingerprint can be captured live using a fingerprint scanner. At step 66, the positive or dominant ridges of the finger print are noted and mapped to numbers in $KT_1$. The fingerprint is divided into a grid which is then mapped to a portion of $KT_1$ containing the same number of elements. A random number generator can be used to select the section of $KT_1$. In one example, the fingerprint is divided into a 4 by 4 grid. At step 68, the fingerprint is mapped to the corresponding $M_1$ Unicode characters. At step 70, a string is created from the corresponding $M_1$ Unicode characters. At step 72, the MAC address of the device scanning the fingerprint is encrypted using $M_1$ encryption. At step 74, the encrypted MAC address is appended to the fingerprint string. This creates a unique device identifier and prevents MAC address cloning.

Figure 6:
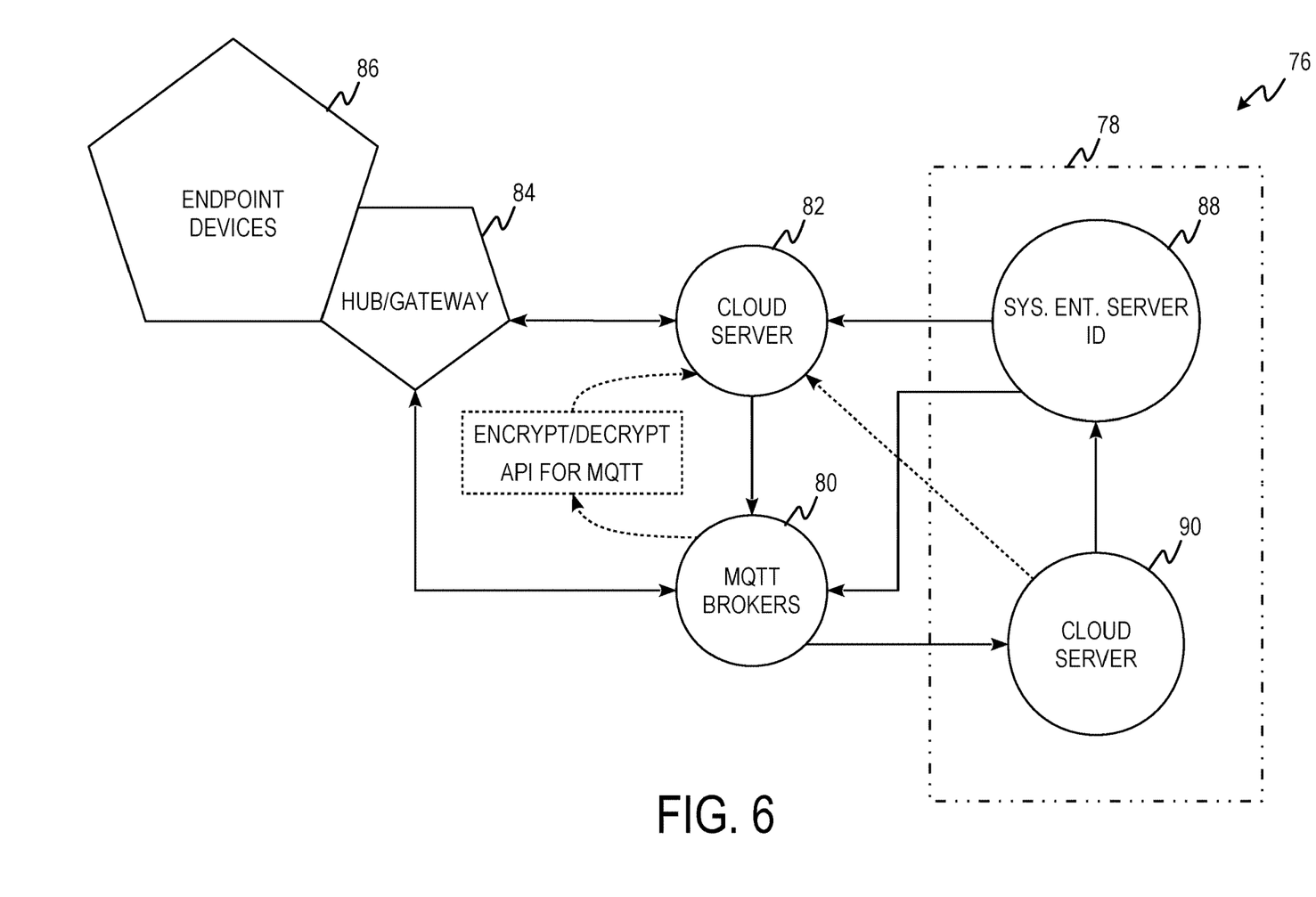
FIG. 6 is an Internet of Things security system using knight's tour encryption/decryption.

FIG. 6 is Internet of Things security system diagram 76 including server 78, Message Queuing Telemetry Transport (MQTT) Broker 80, cloud server 82, hub/gateway 84, and endpoint devices 86. Server 78 includes sys. Ent. Server ID 88 and cloud server 90.

When a user logs into the system on an endpoint device 86 by entering a password, the encryption process is triggered. The endpoint device 86 sends the cipher text as unique offset strings of the password to server 78 for decryption pending authentication. Alternatively, the user could login using eFRI causing the encrypted fingerprint and MAC address to be sent. Server 78 receives the cipher text with a unique string offsets and records the user/device information. Logs of the unique strings are noted; decryption is commenced. If server 78 decrypts the cipher text to get the original text, access is then granted to the local application. A cipher text in the level of the M2-M5 password is stored on server 78. The user can make a request to proceed with data encryption or initiate a call or message. Micro controllers and other nanoIP devices automatically send encrypted message after authentication. Server 78 sends a challenge to device 86 for the user to furnish the PIN created during registration once user tries to encrypt data. This PIN is needed to validate that the right user. (In order to decrypt the cipher text the PIN of the receiver is sent with the message following the chosen M1-M5).

Once the user presents the PIN; logs are taken by server 78 for this transaction. Micro controller based devices, sensor devices and embedded devices (ECU) using MQTT, CoAP and nanoIP infrastructure are authenticated when the server checks the unique eFRI string and finds a match to the number of positive ridges on the finger print. Server 78 authenticates device 86 and grants authorization to send encrypted messages only. The user/device now generates and encrypts MQTT payload and sends this to MQTT broker 80 (maintaining standards and protocol compliance). MQTT Broker 80 will receive and send the data to the proper endpoint device 86 running the client application on it. Server/client 88 checks the received message (since all users are in the database). Since it is an offset it is not decrypted in whole. The client rearranges the string to the right order. This triggers the decryption of the cipher text to the original text. If the target endpoint device(s) 86 used a different data protocols, RESTful API will be used in further communication. The plain text is read with reference to the initial call is not complete and the action is performed on the target device.

Figure 7:
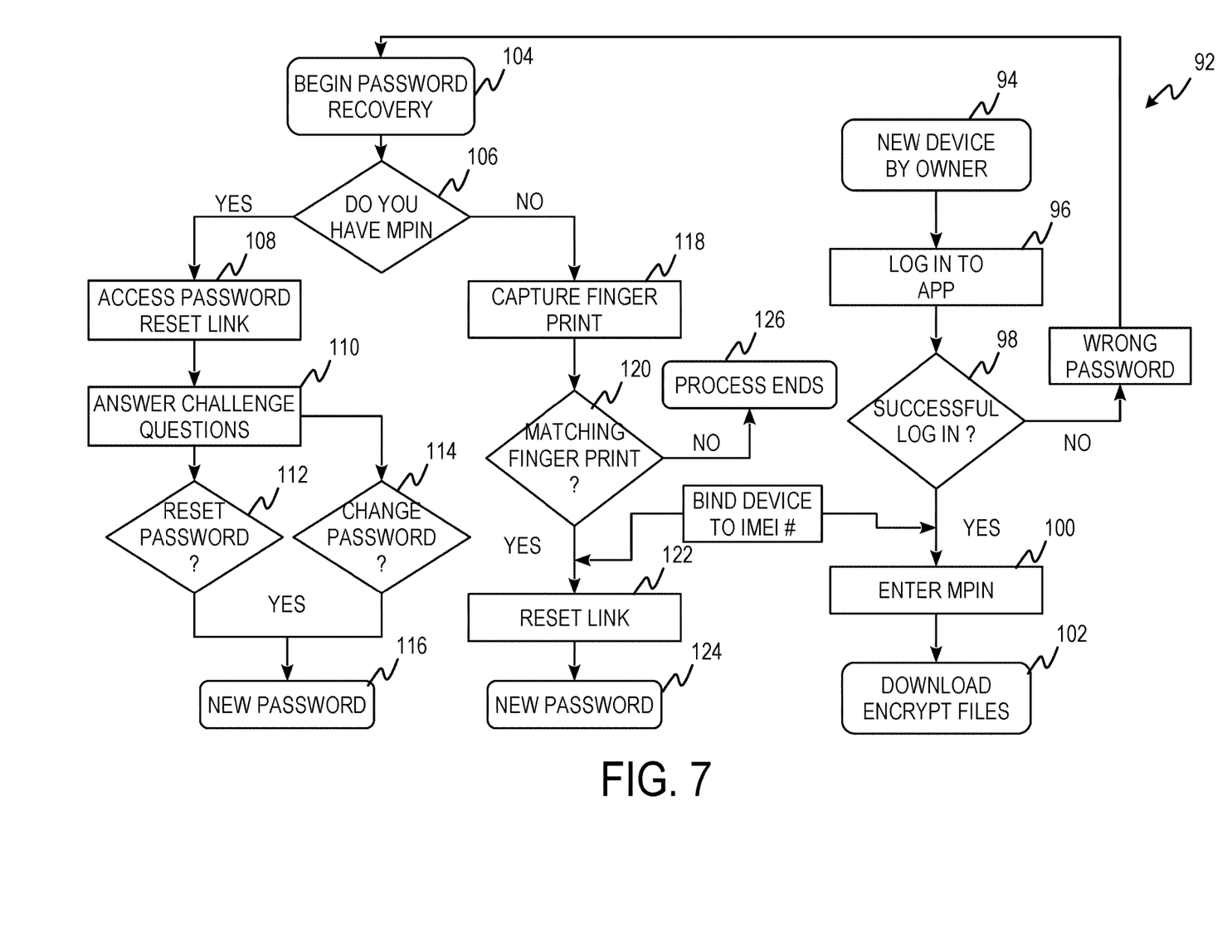
FIG. 7 is a process flow diagram of a new password process using knight's tour encryption/decryption.

FIG. 7 is a process flow diagram of new password process 92 including steps 94, 96, 98, 100, 102, 104, 106, 108, 110, 112, 114, 116, 118, 120, 122, 124 and 126.

At step 94, a new device is accessed by its owner. The device may be an older device that is being used by this owner for the first time. At step 96, an application that utilizes knight's tour encryption/decryption is downloaded and/or the user logs into the application with the owner's username and password. At step 98, the application determines if the log in was successful. If log in was successful an out of bounds call/text is received binding the new device to the IMEI number and process 92 proceeds to step 100. If the log in was unsuccessful due to an incorrect password and/or a nonexistent username, process 92 proceeds to step 104. At step 100, an MPIN is requested and a link is transmitted to the user in response to the Marketing Partner Identification Number (MPIN) being entered.

At step 104, a password recovery process is started. At step 106, an MPIN is requested. If an MPIN is received from the user, process 92 proceeds to proceeds to step 108. If an MPIN is not received from the user, process 92 proceeds to step 118. At step 108, a password reset link is provided to the user. At step 110, challenge questions are posed to the user in response to the user accessing the password reset link. Challenge questions can include requesting the last 4 digits of the user's social security number, asking for a past address, asking for the name of a best friend, asking what the user's first car was, etc. If the challenge questions are answered correctly, process 92 proceeds to step 112 or 114.

At step 112, the password is reset. At step 114, the old password is changed. At step 116, a new password is created and process 92 ends.

At step 118, a fingerprint of the user is captured and received using eFRI. At step 120, the fingerprint is analyzed to determine if it is a match to the fingerprint associated with the account the login was attempted for. If the fingerprint is a match, process 92 proceeds to step 122. If the fingerprint is not a match, process 92 proceeds to step 126. At step 122, a password reset link is sent to the user. At step 124, the password is reset and a new password created in response to the user accessing the reset password link. Process 92 also ends at step 124. At step 126, process 92 ends in response to a failed fingerprint match and the account is flagged.

Figure 8:
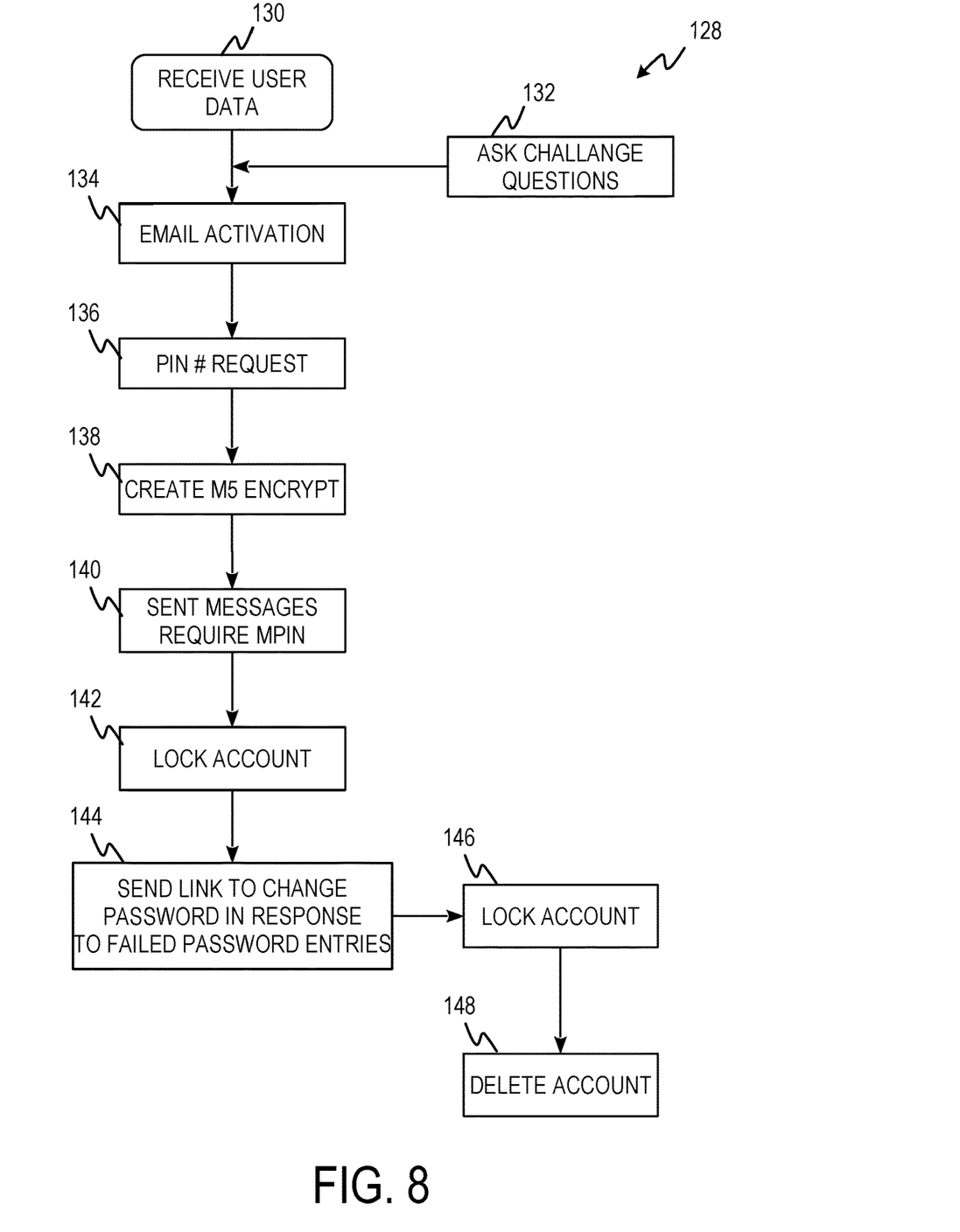
FIG. 8 is a process flow diagram of Marketing Partner Identification Number (MPIN) logic using knight's tour encryption/decryption.

FIG. 8 is Marketing Partner Identification Number (MPIN) logic diagram 128 including steps 130, 132, 134, 136, 138, 140, 142, 144, 146, and 148.

At step 130, user information is received. User information can include email, phone number, username, IMEI, address, date of birth, and eFRI. At step 132, challenge questions are posed to the user and the answers are included in the user registration. At step 134, an email is sent to the user providing a link to confirm and complete registration. At step 136, an MPIN is requested from the user. At step 138, the MPIN is encrypted using knight's tour encryption in response to receiving the MPIN from the user. At step 140, the MPIN is requested in response to the user attempting to send an email or text message. An MPIN is required every interval of 15 minutes while messages are actively being sent. At step 142, the user account locks out after five minutes of non-use. This requires the user to log back in using a password after five minutes of non-use. At step 144, a password reset link is sent via email in response to three failed password attempts. At step 146, the account is locked in response to three failed MPIN entries or failure to reset the password within 5 days of the reset password link being sent. At step 148, the account is disabled if no one attempts to reset the password after 10 days and deleted after 90 days.

Figure 9:
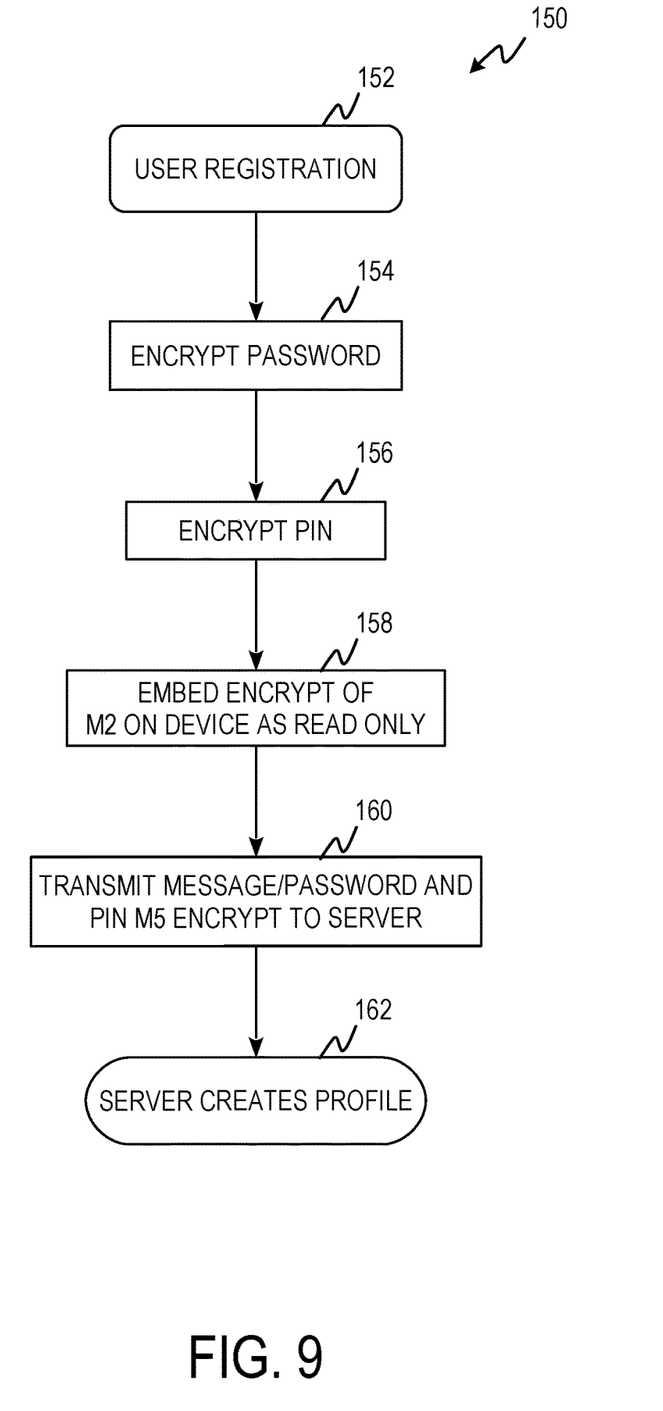
FIG. 9 is process flow diagrams of PIN/password initialization process using knight's tour encryption/decryption.

FIG. 9 is a process flow diagram of pin/password initialization process 150 including steps 152, 154, 156, 158, 160, and 162.

At step 152, a password and PIN are requested. The password can be any alphanumeric string. The PIN is a string of numbers at least four digits long. At step 154, the password is encrypted using knight's tour encryption. In one example, the password is encrypted to with 5 passes of knight's tour encryption resulting in $M_1$-$M_5$ cipher templates and cipher text strings. At step 156, the PIN is encrypted using a modified knight's tour encryption. For each digit of the PIN the characters before and after the corresponding index of the SL-$M_1$ cipher template are retrieved, effectively doubling the string length of the PIN. The resulting SL-$M_1$ PIN string is encrypted using knight's tour encryption. In one example, the SL-$M_1$ PIN string is encrypted with 5 passes of knight's tour encryption. At step 158, the $M_2$ cipher and $KT_3$ starting position are embedded in the user device as read only. At step 160, the $M_5$ cipher text of the password and PIN are transmitted to the server. At step 162, the server creates a profile for the user.

Figure 10:
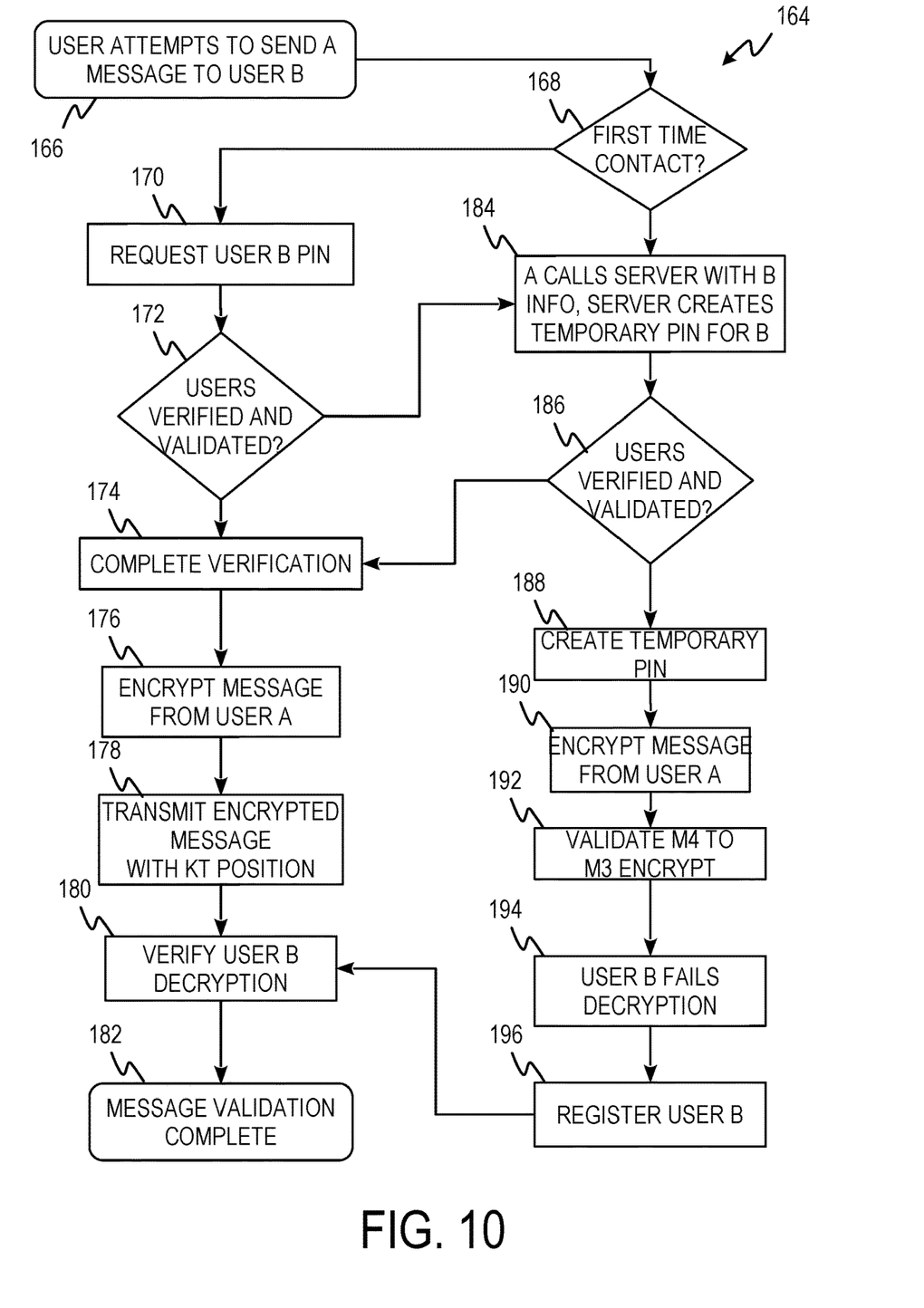
FIG. 10 is a process flow diagram of a data encryption using knight's tour encryption/decryption.

FIG. 10 is a process flow diagram of data encryption process 164 including steps 166, 168, 170, 172, 174, 176, 178, 180, 182, 184, 186, 188, 190, 192, 194, and 196.

At step 166, user A attempts to send a message to user B. At step 168, it is determined whether this is the first-time user A has attempted to contact user B in response to receiving the message attempt. If it is not the first time, process 164 proceeds to step 170. If it is the first time, process 164 proceeds to step 184. At step 170, user B PIN cipher text is requested from the application server. At step 172, the user B cipher text is used to determine if user B exists and is valid. If user B is valid and verified process 164 proceeds to step 174. If user B is invalid or no PIN is retrieved, process 164 proceeds to step 184. At step 174, the verification process is completed. For the verification process to complete at least 3 of 7 user records are verified. User records include PIN, password, email, phone number, username, IMEI, date of birth, address, and eFRI. At step 176, the message from user A is encrypted using knight's tour encryption. In one example, the message is encrypted using five passes of knight's tour encryption resulting in $M_1$-$M_5$ cipher templates and cipher texts. At step 178, the $M_3$ encrypted message is transmitted to user B in response to user A successfully decrypting the $M_4$ cipher of the message. At step 180, the user B's $M_3$ decryption is verified. At step 182, user B is given the remaining information to fully decrypt the message.

At step 184, user A provides the server with information about user B. User A provides as much information as they can about user B's online ID. The server creates a temporary PIN for user B. At step 186, it is determined whether the user IDs are verified and validated. If the user IDs are verified and validated, process 164 proceeds to step 174. If the user IDs are not verified and validated, process 164 proceeds to step 188. At step 188, the temporary PIN is encrypted using knight's tour encryption and the $M_4$ cipher is sent to user A. At step 190, user A's message to user B is encrypted using knight's tour encryption. In one example, the message is encrypted with 5 passes of knight's tour encryption. At step 192, the user A device is validated when the user A device successfully decrypts the $M_4$ message encryption. At step 194, user B fails the decryption of the $M_3$ cipher because the $PKT_3$ is not available in the temporary PIN. At step 196, a registration link is transmitted to user B. After user B registers process 164 proceeds to step 180.

Accordingly, implementing techniques of this disclosure, endpoint-to-endpoint cryptographic systems using knight's tour solutions allow for increased cryptographic complexity compared to currently used systems and methods. Using endpoint-to-endpoint cryptography using knight's tour solutions as described herein, can allow for cryptographic systems that will remain robust as processing power continues to increase.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for verifying devices and encrypting communication comprising:
   a computing device configured to receive plain text; and
   one or more processors configured to encrypt the plain text with knight's tour encryption by being configured to:
      generate a knight's tour table based upon a starting position;
      generate a cipher template by mapping characters of a standard state table to the knight's tour table;
      map the plain text to indices of a first cipher template;
      generate, randomly, a silent password, wherein the silent password has a length equal to a length of the plain text;
      map the silent password to indices of a second cipher template;
      calculate a set of cipher indices using the first cipher template indices corresponding to the plain text and the second cipher template indices corresponding to the silent password, wherein calculating the set of cipher indices comprises:
         (a) calculating a mathematical sum of a corresponding pair of indices from the first cipher template and the second cipher template, wherein the pair of indices includes indices corresponding to characters in a corresponding position in the plain text and in the silent password;
         (b) subtracting the number of indices of the first cipher template from the mathematical sum of the pair of indices in response to the mathematical sum being greater than or equal to the number of indices of the first cipher template; and
         (c) repeating steps (a) and (b) for each corresponding pair of indices from the first cipher template and the second cipher template;
      map the set of cipher indices to the first cipher template; and
      generate a cipher text string from the characters associated with the cipher indices mapped to the first cipher template.

2. The system of claim 1, wherein the computing device is an Internet of Things (IoT) device.

3. The system of claim 1, wherein the second cipher template is a reverse cipher template of the first cipher template.

4. The system of claim 3, wherein one or more processors are configured to generate the reverse cipher template by mapping a reverse standard state table to the knight's tour table.

5. The system of claim 1, wherein the one or more processors are configured to encrypt the plain text using knight's tour encryption a second time using the cipher text string in place of the plain text for the second knight's tour encryption resulting in a second cipher text string.

6. The system of claim 5, further comprising a receiving computing device configured to receive and decrypt the second cipher text string; and
   wherein the computing device is further configured to:
      transmit the second cipher text string and a second knight's tour starting position to the receiving computing device for encryption verification;
      receive a decrypted second cipher text string from the receiving computing device;
      compare the decrypted second cipher text string to the first cipher text string in response to receiving the decrypted cipher text string; and
      transmit the first cipher text string to the receiving computing device in response to the decrypted second cipher text string matching the first cipher text string.

7. The system of claim 1, wherein the plain text is a password.

8. The system of claim 1, wherein the plain text is a personal identification number (PIN), the one or more processors further configured to:

map the PIN to indices of the second cipher template;
form a PIN string from characters on either side of the PIN indices; and
wherein the PIN string is used in place of the plain text of the knight's tour encryption.

9. The system of claim 1, further comprising:
an electronic finger print ridge identifier (eFRI) device configured to electronically capture a fingerprint and determine positive ridges of the fingerprint and provide the electronically captured fingerprint to the one or more processors;
the one or more processors further configured to:
receive the electronically captured fingerprint from the eFRI device;
map the electronically captured fingerprint to a grid;
determine spaces of the grid containing positive ridges of the fingerprint;
map the grid to a portion of the first cipher template; and
form a fingerprint cipher string using characters of the first cipher template that are mapped to the positive ridges of the fingerprint.

10. A method for verifying devices and encrypting communication comprising:
receiving plain text from a computing device; and
encrypting the plain text using one or more processors with knight's tour encryption in response to receiving the plain text, the knight's tour encryption comprising:
generating a knight's tour table based upon a starting position;
generating a cipher template by mapping characters of a standard state table to the knight's tour table;
mapping the plain text to indices of a first cipher template;
generating, randomly, a silent password, wherein the silent password has a length equal to a length of the plain text;
mapping the silent password to indices of a second cipher template;
calculating a set of cipher indices using the first cipher template indices corresponding to the plain text and the second cipher template indices corresponding to the silent password, wherein calculating the set of cipher indices comprises:
(a) calculating a mathematical sum of a corresponding pair of indices from the first cipher template and the second cipher template, wherein the pair of indices contains indices corresponding to characters in a corresponding position in the plain text and in the silent password;
(b) subtracting the number of indices of the first cipher template from the mathematical sum of the pair of indices in response to the mathematical sum being greater than or equal to the number of indices of the first cipher template; and
(c) repeating steps (a) and (b) for each corresponding pair of indices from the first cipher template and the second cipher template;
mapping the set of cipher indices to the first cipher template; and
generating a cipher text string from the characters associated with the cipher indices mapped to the first cipher template.

11. The method of claim 10, wherein the computing device is an Internet of Things (IoT) device.

12. The method of claim 10, wherein the second cipher template is a reverse cipher template of the first cipher template.

13. The method of claim 12, wherein the reverse cipher template is generated by mapping a reverse standard state table to the knight's tour table.

14. The method of claim 10, wherein encrypting the plain text comprises using knight's tour encryption a second time using the cipher text string in place of the plain text for the second knight's tour encryption resulting in a second cipher text string.

15. The method of claim 14, further comprising:
transmitting the second cipher text string and a second knight's tour starting position to a receiving computing device for encryption verification;
receiving a decrypted second cipher text string from the receiving computing device;
comparing the decrypted second cipher text string to the first cipher text string in response to receiving the decrypted cipher text string; and
transmitting the first cipher text string to the receiving computing device in response to the decrypted second cipher text string matching the first cipher text string.

16. The method of claim 10, wherein the plain text is a password.

17. The method of claim 10, wherein the plain text is a personal identification number (PIN), the method further comprising:
mapping the PIN to indices of the second cipher template;
forming a PIN string from characters on either side of the PIN indices; and
wherein the PIN string is used in place of the plain text of the knight's tour encryption.

18. The method of claim 10, further comprising:
receiving an electronically captured fingerprint from an electronic finger print ridge identifier (eFRI) device;
mapping the electronically captured fingerprint to a grid;
determining spaces of the grid containing positive ridges of the fingerprint;
mapping the grid to a portion of the first cipher template; and
forming a fingerprint cipher string using characters of the first cipher template that are mapped to the positive ridges of the fingerprint.

19. A method for verifying devices and encrypting communication, the method comprising: receiving plain text; mapping characters of a standard state table to a knight's tour table, resulting in a first cipher template; generating a second cipher template; mapping characters of the plain text to corresponding indices of the first cipher template, resulting in a first sequence of indices; generating a silent password, wherein a length of the silent password equals a length of the plain text; mapping characters of the silent password to corresponding indices of the second cipher template, resulting in a second sequence of indices; calculating a third sequence of indices using the first sequence of indices corresponding to the plain text and the second sequence of indices corresponding to the silent password, wherein calculating the third sequence of indices comprises: (a) calculating a mathematical sum of a corresponding pair of indices from the first cipher template and the second cipher template, wherein the pair of indices contains indices corresponding to characters in a corresponding position in the plain text and in the silent password; (b) subtracting the number of indices of the first cipher template from the mathematical sum of the pair of indices in response to the mathematical sum being greater than or equal to the number of indices of the first cipher template; and (c) repeating steps (a) and (b) for each corresponding pair of indices from the first cipher template and the second cipher template; and generating a cipher text string by mapping each index of the third sequence of indices to a corresponding character in the first cipher template.

20. The method of claim 19, wherein the second cipher template is a reverse cipher template of the first cipher template.

21. The method of claim 19, wherein the knight's tour table is generated based on a random starting position.

22. The method of claim 19, wherein adding each index of the first sequence of indices to an index in a corresponding position in the second sequence of indices is done using modular arithmetic with a modulus equal to a number of indices in the first cipher template.

23. The method of claim 19, wherein the plain text is a PIN or a password.

24. The method of claim 19, further comprising:
mapping characters of the standard state table to a second knight's tour table, resulting in a fourth cipher template;
generating a fifth cipher template;
mapping characters of the cipher text string to corresponding indices of the fourth cipher template, resulting in a fourth sequence of indices;
mapping characters of the silent password to corresponding indices of the fifth cipher template, resulting in a fifth sequence of indices;
adding each index of the fourth sequence of indices to an index in a corresponding position in the fifth sequence of indices, resulting in a sixth sequence of indices; and
generating a second cipher text string by mapping each index of the sixth sequence of indices to a corresponding character in the fourth cipher template.

\* \* \* \* \*